United States Patent
Clarke et al.

(10) Patent No.: US 9,926,024 B2
(45) Date of Patent: Mar. 27, 2018

(54) MASTER LINK JOINT FOR A TRACK UNDERCARRIAGE AND METHOD OF RETROFITTING AN EXISTING UNDERCARRIAGE

(75) Inventors: Donovan S. Clarke, Hanna City, IL (US); John M. Plouzek, Peoria, IL (US); Laurence J. Cobb, Peoria, IL (US); Matthew W. Trone, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 1045 days.

(21) Appl. No.: 13/151,947

(22) Filed: Jun. 2, 2011

(65) Prior Publication Data

US 2011/0316331 A1 Dec. 29, 2011

Related U.S. Application Data

(60) Provisional application No. 61/359,493, filed on Jun. 29, 2010.

(51) Int. Cl.
| | | |
|---|---|---|
| *B62D 55/205* | (2006.01) |
| *B62D 55/32* | (2006.01) |
| *B62D 55/21* | (2006.01) |
| *B62D 55/28* | (2006.01) |

(52) U.S. Cl.
CPC ........... *B62D 55/32* (2013.01); *B62D 55/213* (2013.01); *B62D 55/28* (2013.01); *Y10T 29/4973* (2015.01)

(58) Field of Classification Search
CPC ...... B62D 55/32; B62D 5/213; Y10T 29/4973
USPC ................................ 305/185, 186, 198, 201
See application file for complete search history.

(56) References Cited

U.S. PATENT DOCUMENTS

| | | | | |
|---|---|---|---|---|
| 3,427,079 | A | * | 2/1969 | Maytum et al. ............... 305/186 |
| 4,365,848 | A | | 12/1982 | Grilli et al. |
| 4,449,357 | A | * | 5/1984 | Balitch ............................ 59/30 |
| 4,457,565 | A | * | 7/1984 | Bissi et al. ..................... 305/186 |
| 4,636,014 | A | * | 1/1987 | Dennison et al. ............ 305/186 |
| 5,887,958 | A | | 3/1999 | Bissi et al. |
| 7,614,709 | B2 | * | 11/2009 | Oertley ......................... 305/186 |
| 7,657,990 | B2 | | 2/2010 | Wodrick et al. |
| 7,877,977 | B2 | * | 2/2011 | Johannsen et al. ............... 59/78 |
| 2002/0062638 | A1 | * | 5/2002 | Bedford et al. .................... 59/7 |

(Continued)

FOREIGN PATENT DOCUMENTS

| | | |
|---|---|---|
| CL | 2980-01 | 2/2002 |
| CL | 44081 | 6/2005 |
| JP | S7179583 | 11/1982 |

(Continued)

*Primary Examiner* — S. Joseph Morano
*Assistant Examiner* — Jean W Charleston
(74) *Attorney, Agent, or Firm* — Miller, Matthias & Hull (57) ABSTRACT

A master link joint for a drive chain is disclosed. The disclosed master link joint includes two master links. Each master link includes a first half link and a second half link that engage each other along mating abutment surfaces. The two master links are disposed on opposite sides of the chain. The first half links are coupled by a pin that traverses the chain and the second half links are coupled by a bushing that traverses the chain. The mating abutment surfaces include a first ramp that meets a second offset ramp at a junction or root. An angle θ defined by the second ramps of the mating abutment surfaces and a line parallel to the rail or bottom pad of the half links ranges from about 45 to about 53°.

20 Claims, 8 Drawing Sheets

(56) References Cited

U.S. PATENT DOCUMENTS

2008/0174175 A1* 7/2008 Livesay et al. ............... 305/186

FOREIGN PATENT DOCUMENTS

| KR | 1019980071309 | 10/1998 |
| KR | 1020080068586 | 7/2008 |
| WO | 200029276 | 5/2000 |

* cited by examiner

MASTER LINK JOINT FOR A TRACK UNDERCARRIAGE AND METHOD OF RETROFITTING AN EXISTING UNDERCARRIAGE

CROSS-REFERENCE TO RELATED APPLICATION

This is a non-provisional application claiming priority under 35 USC §119(e) to U.S. Provisional Patent Application No. 61/359,493 filed on Jun. 29, 2010.

TECHNICAL FIELD

The present disclosure relates generally to a master link joint for a chain of a track undercarriage of a machine and, more particularly, to a master link joint that is less prone to wear and failure.

BACKGROUND

A track machine utilizes chains entrained about a sprocket, rollers, one or more idlers, and a track roller frame. A motor or an engine drives the sprocket, which engages bushings of the chain to move the chain around the track roller frame, thereby propelling the machine in the desired direction.

Typically, the chain includes a master link joint that allows assembly and disassembly of the chain by coupling the ends of the chain at the master link joint. While a "master link joint" is available in many forms, one prevalent design includes two pairs of "master links" disposed on either side of the chain. Each master link includes two "half links", including a "first half link" and a "second half link". A pin, rod or cartridge couples the first half link of one master link to the first half link of the other master link. A bushing couples the second half link of one master link to the second half link of the other master link. The bushing also engages the sprocket. Threaded fasteners couple a shoe to all four half links of the two master links. Thus, a master link joint includes two master links, two first half links coupled together by a pin, rod or cartridge, two second half links coupled together by a bushing, and a shoe that is coupled to all four half links. A master link, on the other hand, includes a first half link and a second half link that are coupled together by the threaded fasteners used to couple the shoe to all four half links.

Although this type of master link joint is widely accepted, it suffers from durability problems. Specifically, the fasteners and half links may break and/or the threads within the individual half links coupled to the shoe may strip. In these situations, the master links of the chain may separate, leaving the machine inoperable and immovable. Additionally, when the threads of the threaded fastener strip, the entire master joint may require replacement.

SUMMARY OF THE DISCLOSURE

In one aspect, a master link for a drive chain includes a first half link that includes a first rail, a bore for receiving a pin and a first mating abutment surface. The master link also includes a second half link that includes a second rail and a second mating abutment surface. When the first half link and the second half link are assembled, the first mating abutment surface of the first half link abuts the second mating abutment surface of the second half link. The first and second mating abutment surfaces each include a first ramp, a second ramp, and a root disposed between the first and second ramps. The second ramps of the first and second mating abutment surfaces of the first and second half links extend at an angle θ with respect to the first and second rails respectively that ranges from about 45 to about 53°.

In another aspect, a disclosed machine includes a drive chain equipped with a master link joint. The master link joint includes two pairs of links, or two master links. Each pair of links includes first half link and a second half link. The two pairs of links are disposed on opposite sides of the chain. Each first half link includes a bore for accommodating a pin that couples the first half links together. Each first half link also includes a first rail. Each second half link is coupled to the other second half link by a pin or bushing. Each second half link includes a second rail. A shoe is coupled to the first and second half links of each pair. The first and second half links of each master link each include first and second mating abutment surfaces respectively. The first and second mating abutment surfaces each include two ramps including a first ramp that extends past its respective pin or bushing. Each first ramp meets a second ramp at a root. Each second ramp extends outwardly from its respective first ramp. Further, a line planar with the second ramp and a line parallel to its respective first or second rail defines an angle θ ranging from about 45 to about 53°.

In another aspect, a method for retrofitting an existing chain of a track-driven machine with an improved master link joint is disclosed. The method includes: removing an existing master link joint from the chain; providing two master links, each master link including a pair of half links, each pair of half links including a first half link and a second half link, each first half link including a bore for accommodating a pin and a first rail, each second half link being coupled to a pin or bushing, each second half link including a second rail, the first and second half links each including first and second mating abutment surfaces respectively, the first and second mating abutment surfaces each including two ramps including a first ramp extending past its respective pin or bushing, each first ramp meeting a second ramp at a root, each second ramp extending outwardly from its respective first ramp, a line planar with the second ramp and a line parallel to its respective first or second rail defining an angle θ ranging from about 45 to about 53°; the method further includes coupling the first half links together and to another pair of links in the chain with the pin; coupling the second half links together with the pin or bushing; engaging the first and second mating abutment surfaces of each pair; and connecting a shoe to all four half links.

In another aspect, another half link for a master link joint is disclosed that includes a mating abutment surface. The mating abutment surface includes a pair of threaded holes for receiving threaded fasteners. The mating abutment surface further includes at least one root, at least one tip and at least one width change along a length of the mating abutment surface. The mating abutment surface also includes offset regions surrounding the holes. The offset regions isolate the holes from any width changes, roots and tips disposed along the mating abutment surface.

In combination with any one or more of the aspects described above, the first half link may further include a third ramp that meets the second ramp of the first half link and that is at least substantially parallel to the first ramp of the first half link.

In combination with any one or more of the aspects described above, lines coplanar with the first and third ramps of the first half link are spaced apart by a first offset distance and the first half link has a first thickness at the bore or pin.

A ratio of the first offset distance to the first thickness ranges from about 0.75 to about 1.2.

In combination with any one or more of the aspects described above, lines coplanar with the first and third ramps of the second half link are spaced apart by a second offset distance and the second half link has a second thickness at the bushing or pin. A ratio of the second offset distance to the second thickness ranging from about 0.9 to about 1.35.

In combination with any one or more of the aspects described above, the first offset distance of the first half link ranges from about 40 to about 50 mm.

In combination with any one or more of the aspects described above, θ of the first half link is about 50°.

In combination with any one or more of the aspects described above, the second offset distance of the second half link ranges from about 40 to about 50 mm.

In combination with any one or more of the aspects described above, θ of the second half link is about 50°.

In combination with any one or more of the aspects described above, the second half link includes an eyebrow area that extends at least partially around the bushing or phi. The eyebrow area has a lateral thickness greater than a thickness of the second half link at the bushing.

In combination with any one or more of the aspects described above, the second half link includes an eyebrow area that extends at least partially around the pin or bushing. The eyebrow area has a lateral thickness greater than about 50 mm.

In combination with any one or more of the aspects described above, the first and second half links each include an eyebrow area that extends at least partially around the respective pin or bushing. In such an embodiment, the eyebrow area of the second half link may have a lateral thickness that ranges from about 20 to about 50% greater than a lateral thickness of the eyebrow area of the first half link.

DETAILED DESCRIPTION

Figure 1:
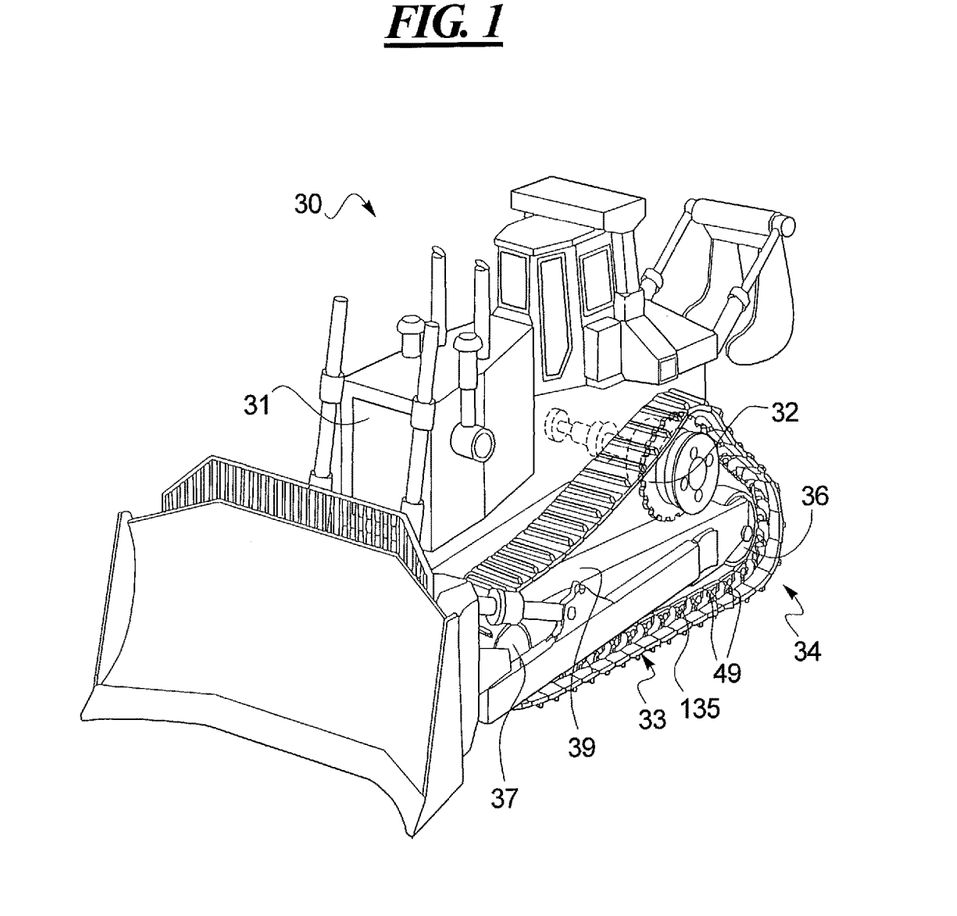
FIG. 1 is a perspective view of a machine equipped with a track undercarriage that may accommodate a disclosed master link joint.

FIG. 1 illustrates a machine 30 equipped with a track undercarriage 34 that can accommodate the improved master link joints. A power source 31, such as a gasoline or diesel engine, gas turbine, or electric motor powers the machine 30. Specifically, the power source 31 drives the sprocket 32, which engages one or more of a plurality of bushings 135 of a chain 33. The sprocket 32 rotates thereby cycling the chain 33 about the spaced apart idlers 36, 37. The track roller frame 39 connects the idlers 36, 37 together.

Figure 2:
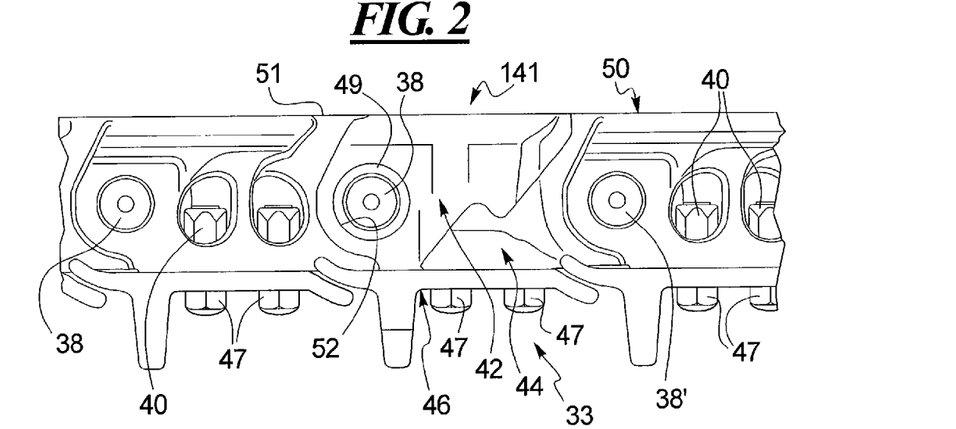
FIG. 2 is a partial side view of a master link joint coupled to forward and rearward links of a chain.
Figure 3:
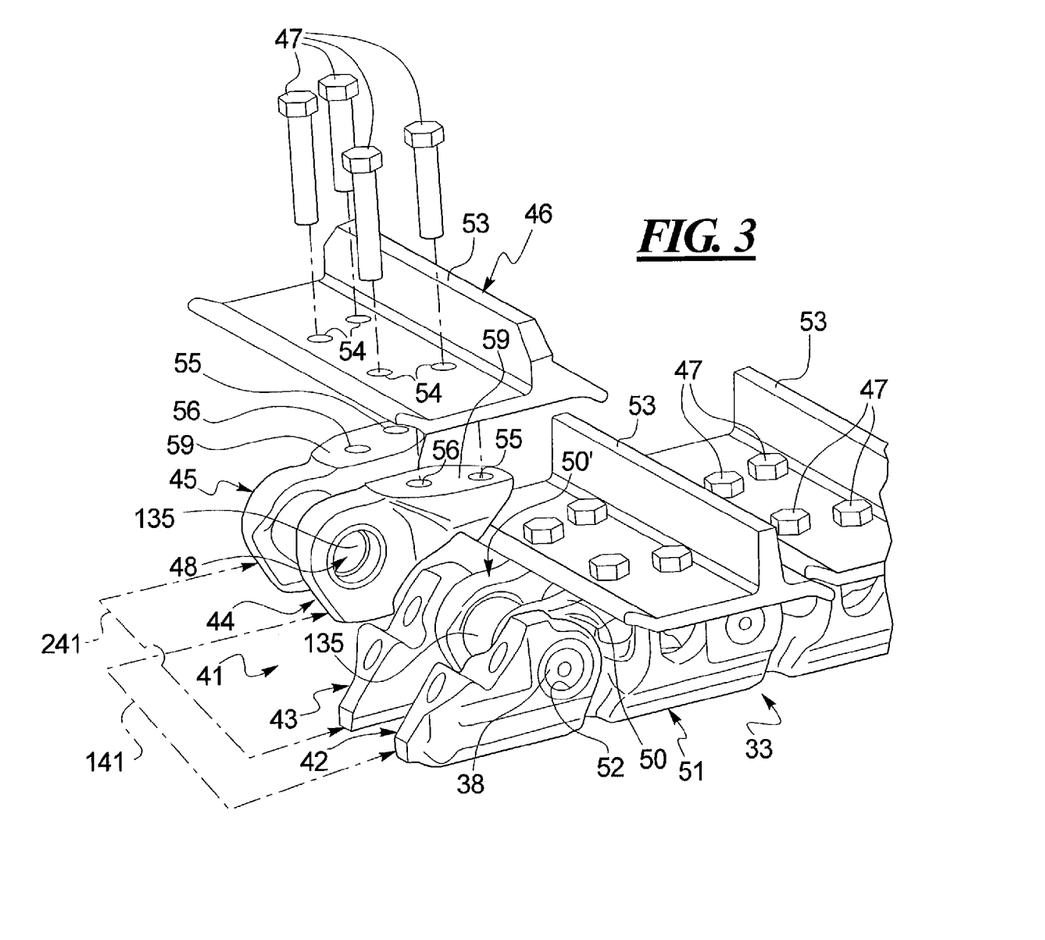
FIG. 3 is a partial exploded view illustrating the four links of a disclosed master link joint and the coupling of the first half links of the master link joint to standard links disposed behind (or to the right) the first half links and the coupling of a shoe to the two second half links and two first half links of the disclosed master link joint.

Turning to FIG. 2, one-half of a master link joint 41 or, more specifically, the master link 141 may be in the form of a first half link 42 and a second half link 44. The first half link 42 includes a bore 52 that accommodates a pin 38 that is used to couple the two first half links 42, 43 together as shown in FIG. 3. The pin 38 may also couple the first half links 42, 43 to a pair of rear links 50, 50'. The pin 38 may also be in the form of a rod or cartridge. FIG. 2 also illustrates a shoe 46 coupled to the first and second half links 42, 44 with threaded fasteners 47 (see also FIG. 3).

Turning to FIG. 3, the shoe 46 may be used to connect all four half links 42, 43, 44, 45 of a master link joint 41 together. The shoe 46 may include a cleat 53 used for traction. The threaded fasteners 47 may pass through openings 54 in the shoe 46 and be received in threaded sections 155, 156 of the holes 55, 56 disposed near the rails 69, 269 of the first half links 42, 43 as shown in greater detail in FIGS. 4, 19 and 23. The bushing 135 couples the second half link 44 to the second half link 45. The sprocket 32 (FIG. 1) engages the bushing 135 as it drives the chain 33. As illustrated in FIG. 3, the master link joint 41 includes the master link 141 and the master link 241. The master link 141 includes the first half link 42 and the second half link 44. The master link 241 is disposed opposite the chain 33 from the master link 141 and includes the first half link 43 and the second half link 45. The shoe 46 couples the master link 141 to the master link 241.

Figure 4:
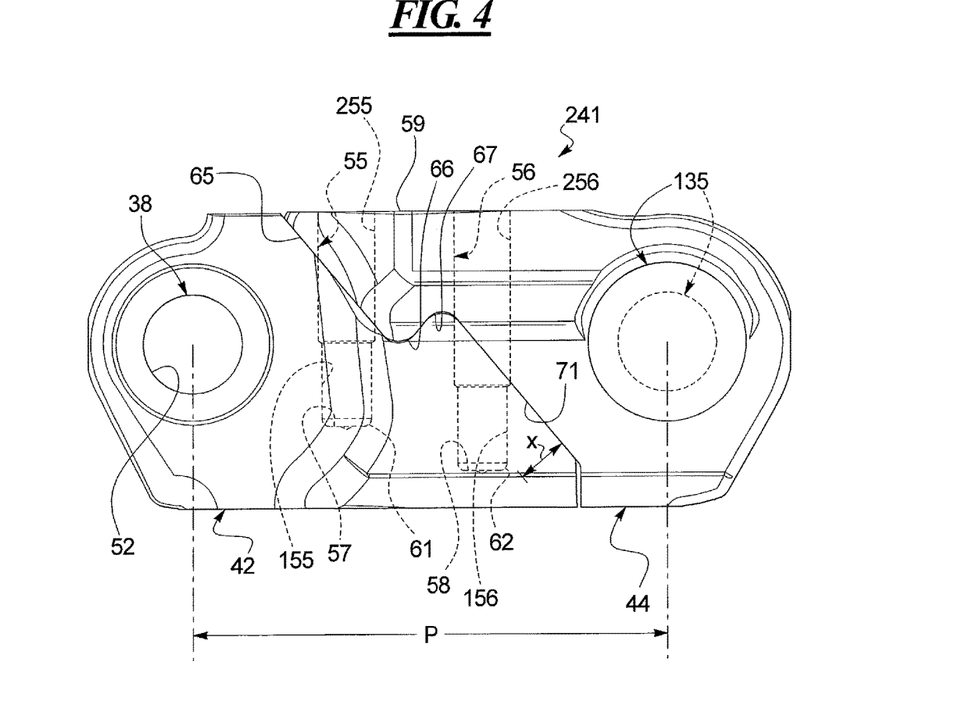
FIG. 4 is a side view of one pair of first and second half links of a master link, particularly illustrating the holes used to accommodate fasteners used to couple a shoe to the first and second half links.

Turning to FIG. 4, the unthreaded sections 255, 256 of the holes 55, 56 may pass through the shoe abutment surface 59 of the second half link 44 and extend into the first half link 42, which includes the threaded sections 155, 156 of the holes 55, 56. The bottoms 57, 58 of the threaded sections 155, 156 of the holes 55, 56 may be relatively flat and may include corners 61, 62 having radii of about 5 mm, although the bottom corner radii may vary. As shown in phantom in FIG. 4, the pin 38 and bushing 135 may be different or equal in size.

Figure 5:
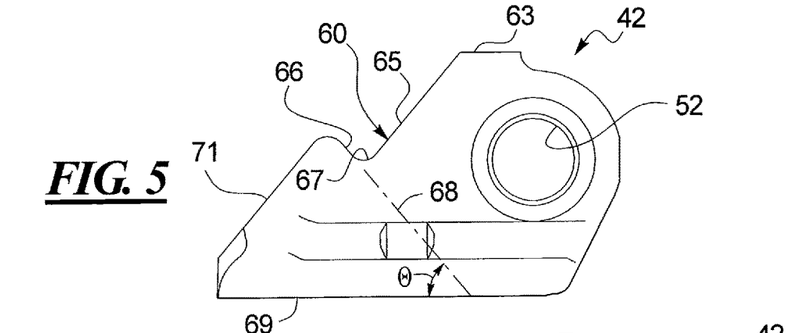
FIG. 5 is a front plan view of a disclosed first half link.

Turning to FIGS. 5-10, various geometrical features of the first half link 42 are illustrated. As seen in FIG. 5, the first half link 42 may include a shoe clearance surface 63. The first half link 43 also includes a first mating abutment surface 60 that includes a first ramp 65 that extends downwardly from the perspective of FIG. 5 or past the bore 52 towards a junction or root 67 where it meets a second ramp 66. From the perspective of FIG. 5, the first ramp 65 extends downwardly towards the root 67 and the second ramp 66 extends upwardly or outwardly away from the first ramp 65 to provide an offset between the first ramp 65 and a third ramp 71. A line 68 that is coplanar with the second ramp 66 and a line that is coplanar with the rail 69 or the shoe clearance surface 63 define an angle θ that can range from about 45 to about 53°. It has been surprisingly found that angles above or below this range provide inferior first half links. While θ may range from about 45 to about 53°, with some embodiments ranging from about 48 to about 52°, in one embodiment, an angle θ of about 50° was found to be particularly effective. Use of a θ above 53° may place too much stress on the fasteners 47. Further, use of a θ below 45° may provide inferior mating abutment mating surfaces 60, 370 for the first and second half links 42, 44 (see FIGS. 5 and 23) and inferior mating abutment mating abutment surfaces 260, 70 for the first and second half links 43, 45 (see FIGS. 11 and 17).

Interestingly, using a θ between about 45 and about 53°, the half links 42, 44 and 43, 45 of the master links 141, 241 (FIG. 3) remain connected through a larger rotation than previous links. As a result, without being bound by theory, applicants submit that the load distribution through the master links 141, 241 is at least partially dependent on the selected θ, at least when θ ranges from about 45 to about 53°. Further, shallow angles for θ may result in less ability for the link to handle drawbar direction loading and can put more stress on the bolts used to secure the shoe 46 to the links 42-45. Steeper angles for θ may result in either the need for much smaller root radii on the ramp intersections and thus lead to higher stresses or the need to make the small planar surface between the root radii too small and thus not much load carrying capacity, again putting more stress on the bolts. Optimum θ angles allow both large enough radii in the tooth roots so as to not cause high stresses and for better load carrying capacity of the link so the bolts are not prone to strip or fail.

Figure 6:
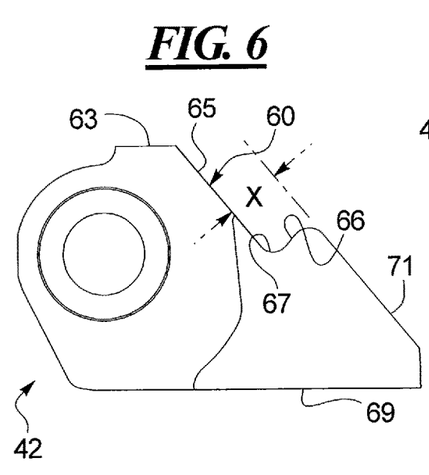
FIG. 6 is a rear plan view of the first half link shown in FIG. 5.

Returning to FIGS. 5-10, the first half link 42 also includes a third ramp 71 disposed opposite the second ramp 66 from the first ramp 65. Thus, the second ramp 66 provides for a lateral offset "x" between the third ramp 71 and the first ramp 65 as shown in FIG. 6. A ratio of an effective lateral offset x or distance between the first and third ramps 65, 71 to the link thickness y (FIG. 7) may range from about 0.75 to about 1.2 with a ratio of one particular embodiment being about 0.8. For example, one effective link has a second ramp 66 that provides a lateral offset x of about 45 mm while the link has a thickness y of about 57.5 mm. Thus, in one non-limiting embodiment, the angle θ may be about 50° and a ratio of lateral offset x to link thickness y (FIGS. 6-7) may be about 0.8.

Figure 7:
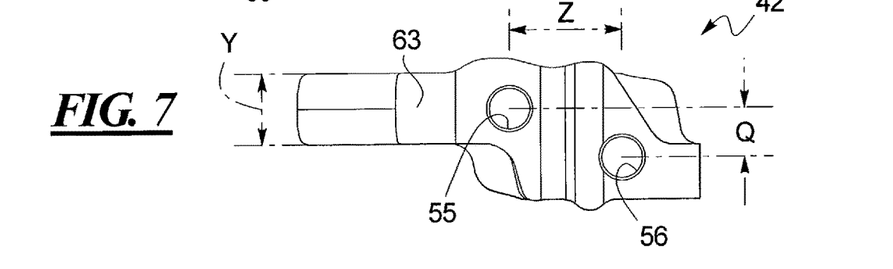
FIG. 7 is a top plan view of the first half link shown in FIGS. 5-6.
Figure 8:
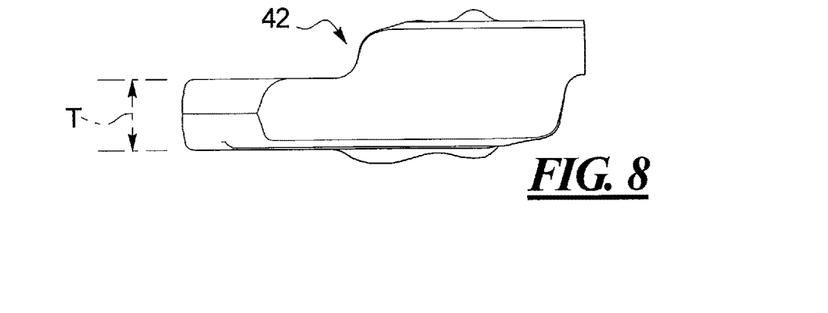
FIG. 8 is a bottom plan view of the first half link shown in FIGS. 5-7.
Figure 9:
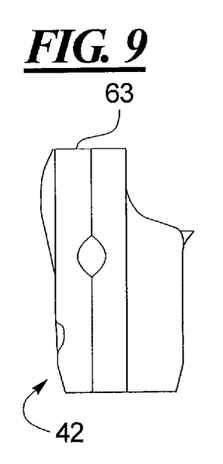
FIG. 9 is a left side view of the first half link shown in FIGS. 5-8.
Figure 10:
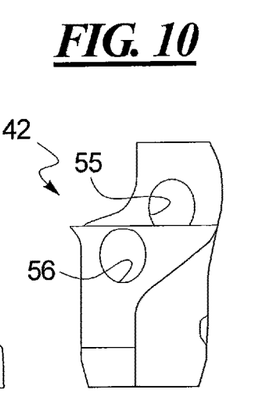
FIG. 10 is a right side view of the first half link shown in FIGS. 5-9.
Figure 11:
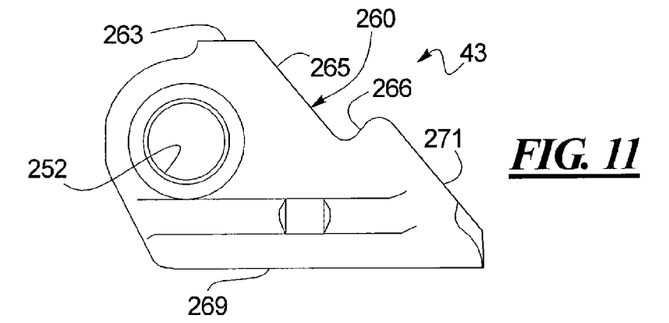
FIG. 11 is a front plan view of another first half link, which is intended to be disposed opposite the chain from the first half link shown of FIGS. 5-10, the first half link of FIG. 11 being a mirror image of the first half link of FIGS. 5-10.
Figure 12:
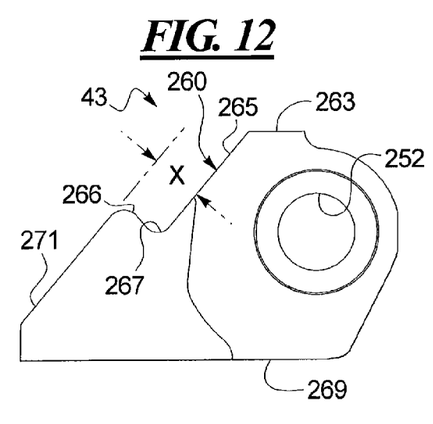
FIG. 12 is a rear plan view of the first half link shown in FIG. 11.
Figure 13:
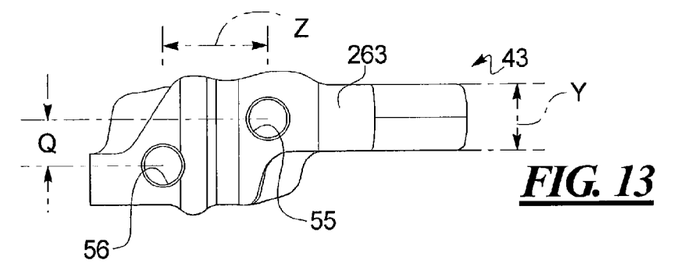
FIG. 13 is a top plan view of the first half link shown in FIGS. 11-12.
Figure 17:
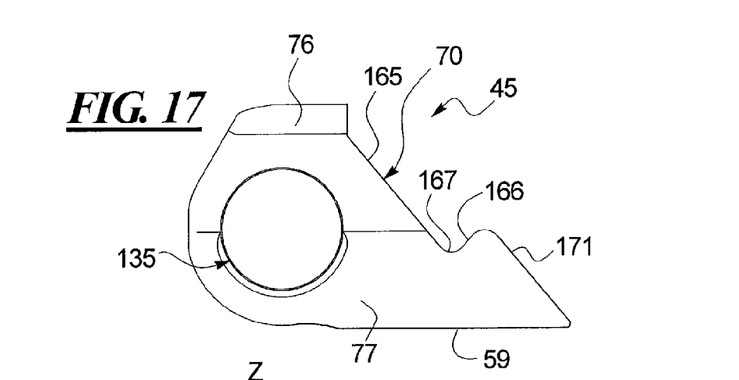
FIG. 17 is a front plan view of a second half link.

Turning to FIGS. 7 and 10, the holes 55, 56 are shown that receive the threaded fasteners 47 after the fasteners 47 pass through the unthreaded sections 255, 256 of the holes 55, 56 through the second half link 44 (FIG. 4). As shown in FIG. 7, the lateral spacing "z" between the holes 55, 56 may be reduced, as compared to the spacings of the prior art, to a range of from about 88 to about 92 mm with one particularly effective embodiment having a lateral spacing z of about 91 mm. This represents a reduction in comparison to the prior art of from about 2% to about 5%. Further, the lateral spacing "Q" is increased in comparison to the prior art to a range of from about 35 to about 45 mm, more preferably from about 38 to about 42 mm, with one particular lateral spacing Q being about 40 mm. The spacing Q represents an increase of from about 15 to about 25% over a corresponding prior art lateral spacing. If z becomes too small, the mating abutment surfaces 60, 70, 260, 370 may become too small to accommodate the ramps 65, 66, 71 (FIG. 5), 265, 266, 271 (FIG. 11), 165, 166, 171 (FIG. 17) and 365, 366, 371 (FIG. 17). To maintain load capacity, if z is decreased, Q may be increased.

Figure 18:
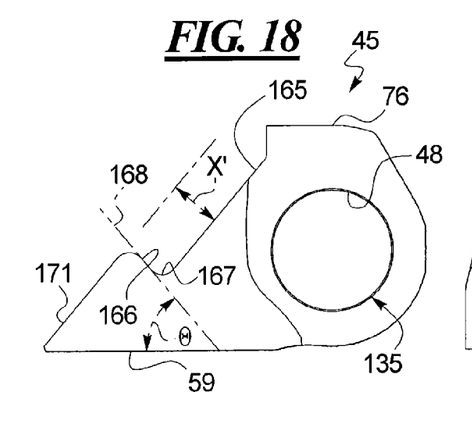
FIG. 18 is a rear plan view of the second half link shown in FIG. 17.
Figure 19:
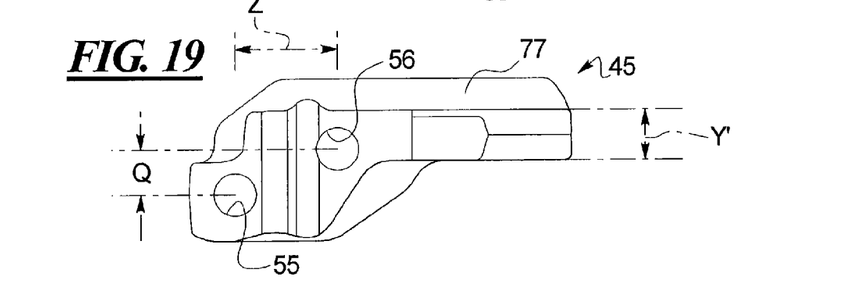
FIG. 19 is a top plan view of the second half link shown in FIGS. 17-18.
Figure 20:
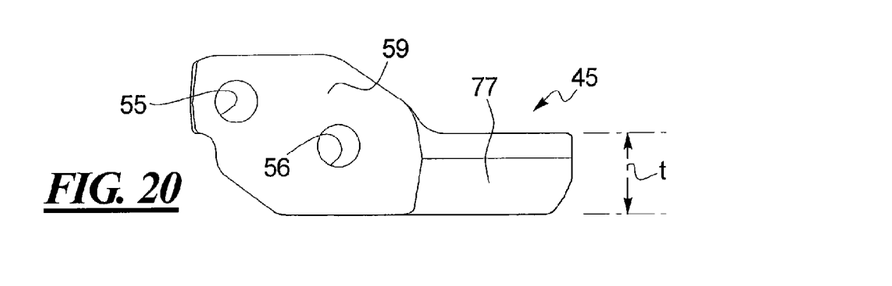
FIG. 20 is a bottom plan view of the second half link shown in FIGS. 17-19.
Figure 21:
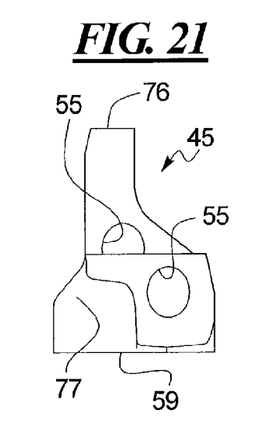
FIG. 21 is a left side view of the second half link shown in FIGS. 17-20.
Figure 22:
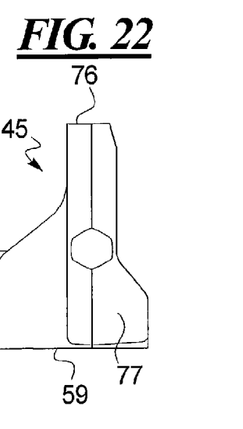
FIG. 22 is a right side view of the second half link shown in FIGS. 17-21.

Turning to FIGS. 17-22, the second half link 45 includes a shoe abutment surface 59 and an eyebrow area 77 below the bushing 135 in the orientation of FIG. 17 (see also 377 of FIG. 22). Similar to the first half link 43, the second half link 45 includes a second mating abutment surface 70 that includes a first ramp 165 that extends downward from the rail 76 past the bushing 135 to a root 167 where it meets a second ramp 166 which, in turn, meets a third ramp 171. As shown in FIG. 18, an angle θ is defined by the line 168 that is coplanar with the second ramp 166 and a line that is planar or parallel with the rail 76 or shoe abutment surface 59. The angle θ preferably ranges from about 45 to about 53°, most preferably about 50°. Referring to FIGS. 18 and 19, the ratio of the lateral offset x' between the first ramp 165 and third ramp 171 to the thickness y' may range from about 0.9 to about 1.35, with a value of about 1 being particularly effective. The shoe abutment surface 59 and holes 55, 56 with threaded sections 155, 156 are shown in FIGS. 19-20.

Figure 14:
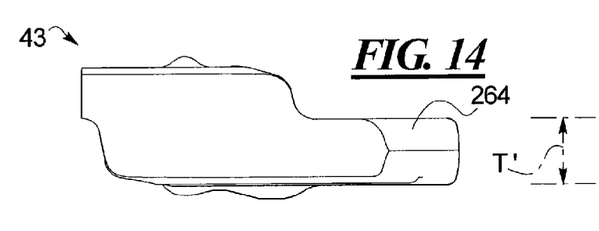
FIG. 14 is a bottom plan view of the first half link shown in FIGS. 11-13.
Figure 15:
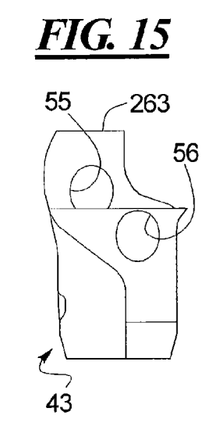
FIG. 15 is a left side view of the first half link shown in FIGS. 11-14.
Figure 16:
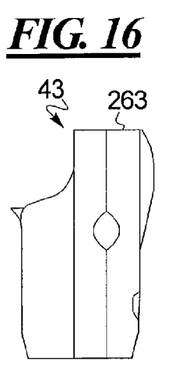
FIG. 16 is a right side view of the first half link shown in FIGS. 11-15.
Figure 23:
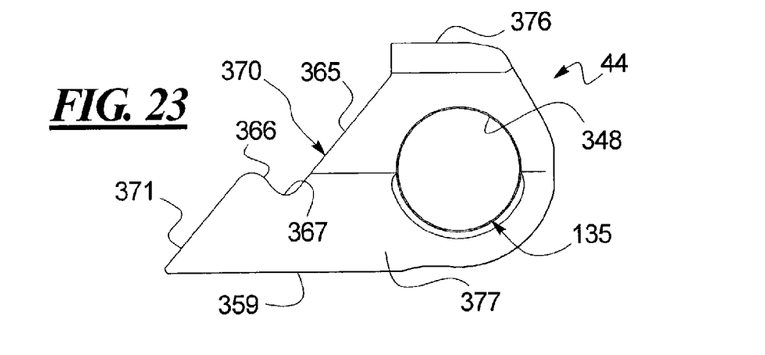
FIG. 23 is a front plan view of another second half link intended to be disposed opposite the chain from the second half link shown in FIGS. 17-22, the second half link of FIG. 23 being a mirror image of the second half link of FIGS. 17-22.

Referring to FIGS. 17-28, another feature of the second half links 44, 45 is a thickened eyebrow area 77, 377 shown below the bushing 135 in the front views of FIGS. 17 and 23 and better shown in the end views of FIGS. 21-22 and 27-28 respectively. The thicknesses t, t' shown in FIGS. 20 and 26 may range from greater than about 50 to about 85 mm, more preferably from about 60 to about 75 mm, with one particularly effective thickness being about 72 mm. For purposes of comparison, a typical thicknesses T, T' in comparable areas of the first half links 42, 43 as shown in FIGS. 14 and 20 may range from about 40 to about 60 mm. Thus, the added thicknesses in the eyebrow areas 77, 377 (FIGS. 20 and 26) can range from about 10 to about 20 mm, more preferably from about 12 to about 16 mm, with one particular eyebrow area 77, 377 having a thickness t, t' increased from about 48 mm to about 72 mm. The benefit of the thickened eyebrow areas 77, 377 is an increased stiffness without encroaching on the space provided by the bushing 135 for engaging the sprocket 32. In general, the overall thicknesses t, t' of the second half links 44, 45 may be increased by an amount ranging from about 20 to about 50% in comparison to prior art second half links and the corresponding first half links 42, 43 the of master links 141, 241. As discussed above in connection with FIGS. 7 and 10, the spacing z between the holes 55, 56 (FIGS. 7, 13, 19 and 25) has been decreased by an amount ranging from about 2 to about 5% while the lateral spacing Q has been increased by an amount ranging from about 15 to about 25%. To maintain load capacity, if z is decreased, Q may be increased.

Figure 24:
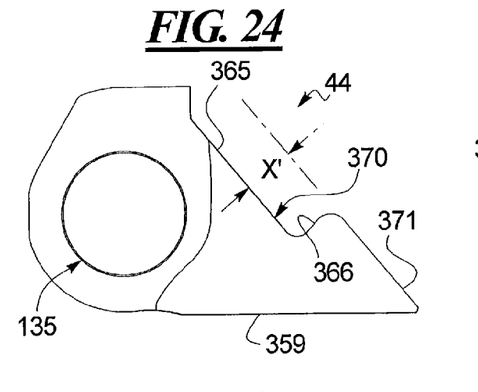
FIG. 24 is a rear plan view of the second half link shown in FIG. 23.
Figure 25:
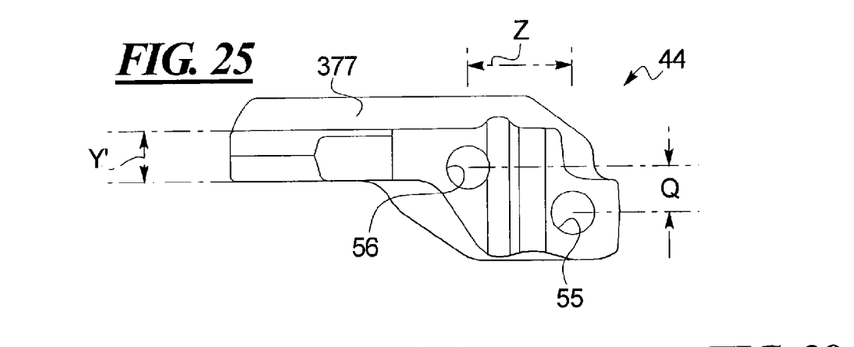
FIG. 25 is a top plan view of the second half link shown in FIGS. 23-24.
Figure 26:
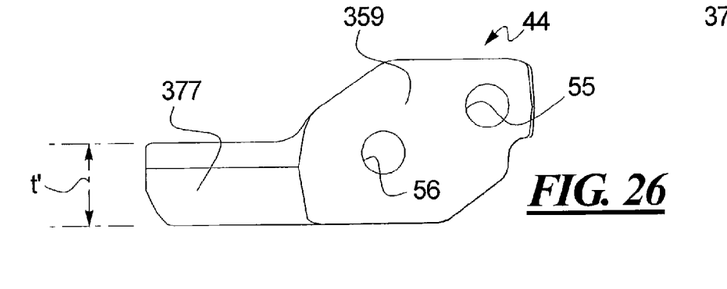
FIG. 26 is a bottom plan view of the second half link shown in FIGS. 23-25.
Figure 27:
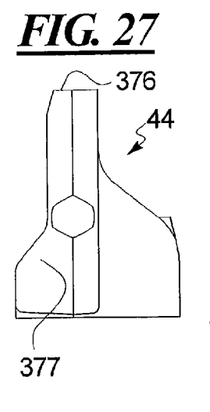
FIG. 27 is a left side view of the second half link shown in FIGS. 23-26.
Figure 28:
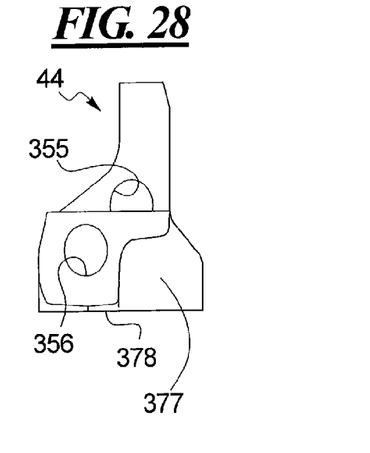
FIG. 28 is a right side view of the second half link shown in FIGS. 23-27.

The mirror images of the half links 42, 45 shown in FIGS. 5-10 and 17-21 respectively are shown in FIGS. 11-16 and 23-28 respectively, with like parts being identified with the same numerals and a "2" prefix (FIGS. 11-16), a "3" prefix (FIGS. 23-28), an X for the ramp offset or spacing (FIG. 12) and an X' for the ramp offset or spacing (FIG. 24).

Another disclosed ratio can be understood with reference to FIGS. 4 and 6, FIGS. 4 and 12, FIGS. 4 and 18, and FIGS. 4 and 24. Specifically, referring to FIG. 4, the straight line distance between the axial center of the pin 38 (or pin bore) and bushing 135 (or bushing bore) is the track pitch P. Another useful ratio is the ratio of the ramp spacing x (FIGS. 4 and 6), X (FIG. 12), x' (FIG. 18), X' (FIG. 24) divided by the track pitch P. Thus, additional useful ratios include x/P, X/P, x'/P and X'/P. A useful range for x/P, X/P, x'/P and X'/P is from about 0.1 to 0.25, with select useful ratios including 0.14, 0.17 and 0.19.

The geometry of the ramps 65, 66, 71 (FIG. 5), 265, 266, 271 (FIG. 11), 165, 166, 171 (FIG. 17) 365, 366, 371 (FIG. 23) and the locations of the bolt holes 55, 56 (FIGS. 7, 13, 19, 25) keep stress risers caused by the ramps and stress risers caused by the bolt holes 55, 56 from compounding one another. In other words, stress risers resulting from the bolt holes 55, 56 are spaced apart from the ramp contour stress risers and at the same time allow enough bolt length and bolt thread engagement thereby avoiding breakage of the bolts or stripping of the bolt threads.

Figure 29:
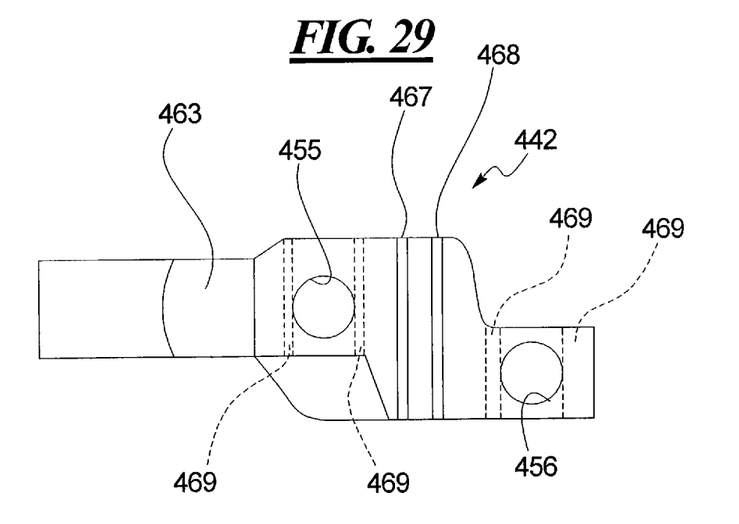
FIG. 29 is a top view of another first half link illustrating an arrangement of the threaded holes on a mating abutment surface away from potential stress risers.
Figure 30:
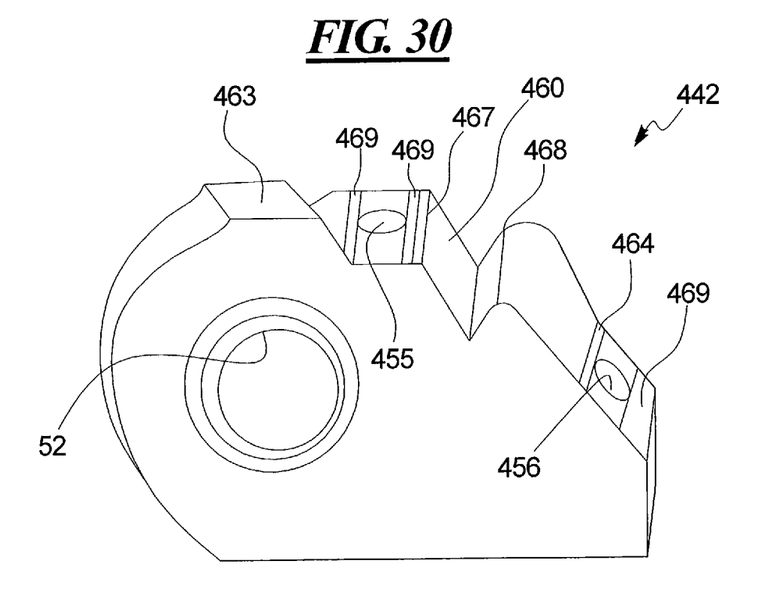
FIG. 30 is a perspective view of the first half link of FIG. 29.

FIGS. 29 and 30 is a top and perspective views of another first half link 442 that features a placement of the threaded holes 455, 456 on the mating clearance surface 460 away from potential stress risers. Specifically, the mating clearance surface 460 extends from the shoe clearance surface 463. The mating clearance surface 460 is undulating and includes at least one root 467, at least one tip 468 and at least one width change along the length of the mating clearance surface 460. The mating clearance surface 460 also includes offset regions 469 disposed on either side of the holes 455, 456 that buffer the holes 455, 456 from any local stress risers that result from the width changes, roots 467 or tips 468 disposed along the mating clearance surface 460.

INDUSTRIAL APPLICABILITY

The disclosed master link joints are applicable to any machine where durability of the chain is required. The disclosed master link joints may improve the durability of the track undercarriage by insuring proper assembly and minimizing failure of the master link joint. By providing improved master link joints with better durability and longer operating lives, operating costs are reduced.

Each master link joint includes two master links disposed on either side of the chain. One disclosed master link includes a first half link including a first rail, a bore for receiving a pin and a first mating abutment surface. Such a master link also includes a second half link including a second rail and a second mating abutment surface. The second half link is coupled to a bushing or pin, which connects the second half link to the second half link disposed on the opposite side of the chain. The bushing or pin may also be used to engage the drive sprocket.

When the first half link and the second half link are assembled, the first mating abutment surface of the first half link abuts the second mating abutment surface of the second half link. The first and second mating abutment surfaces each include a first ramp, a second ramp, and a root disposed between the first and second ramps. The second ramps of the first and second mating abutment surfaces of the first and second half links extend at an angle θ with respect to the first and second rails respectively that ranges from about 45 to about 53°. Use of an angle θ within this range provides for better contact between the first and second half links through a larger rotation and therefore improved load distribution characteristics. Superior results have been obtained using a θ of about 50°.

The first half links may also include a third ramp that meets the second ramp of the first half link and that is at least substantially parallel to the first ramp of the first half link. Lines coplanar with the first and third ramps of the first half link may be spaced apart by a first offset distance or the length of the second ramp. The first half link may have first thickness at the bore and a ratio of the first offset distance to the first thickness may range from about 0.75 to about 1.2. Similarly, the second half link may also include a third ramp that meets the second ramp of the second half link and that is at least substantially parallel to the first ramp of the second half link. Lines coplanar with the first and third ramps of the second half link may be spaced apart by a second offset distance or length of the second ramp. The second half link may have second thickness at the bushing and a ratio of the second offset distance to the second thickness may range from about 0.9 to about 1.35. The first offset distances of the first and second half links may range from about 40 to about 50 mm.

Another feature of the second half links includes a thickened eyebrow area extending at least partially around the bushing. The eyebrow areas have a lateral thickness greater than a thickness of first and second ramps without interfering with the contact between the sprocket and the bushing. The benefit of the thickened eyebrow areas is an increased stiffness and therefore improved wear characteristics without encroaching on the space provided by the bushing for engaging the sprocket. The eyebrow area may have a lateral thickness greater than about 50 mm and may be from 20 to about 50% greater than a corresponding lateral a thickness of the eyebrow areas of the first half links.

A method for retrofitting an existing chain of a track-driven machine with an improved master link is also disclosed. The method includes removing an existing master link joint from the chain and providing two disclosed master links. The method also includes coupling the first half links together and to another pair of links in the chain with the pin, coupling the second half links together with a bushing, engaging the first and second mating abutment surfaces of each pair and connecting a shoe to all four half links.

A half link for a master link joint is also disclosed. The half link includes a mating abutment surface that includes at least two threaded holes for receiving threaded fasteners. The mating abutment surface also includes at least one root, at least one tip and at least one width change along a length of the mating abutment surface. The mating abutment surface also includes offset regions surrounding the holes. The offset regions isolate the holes from any width changes, roots and tips disposed along the mating abutment surface and therefore isolate the holes from any stress risers that result from these features.

What is claimed is:

1. A master link for a drive chain, comprising:
a first half link including a first rail, a bore for receiving a pin and a first mating abutment surface; and
a second half link including a second rail, a bore for receiving a bushing or pin, and a second mating abutment surface;
when the first half link and the second half link are assembled, the first mating abutment surface of the first half link abutting the second mating abutment surface of the second half link,
the first and second mating abutment surfaces each including a first ramp, a second ramp, and a root disposed between the first and second ramps,
the second ramps of the first and second mating abutment surfaces of the first and second half links extending at an angle θ with respect to the first and second rails respectively that ranges from about 45 to about 53°.

2. The master link of claim 1 wherein the first half link further includes a third ramp that meets the second ramp of the first half link and that is at least substantially parallel to the first ramp of the first half link, wherein lines coplanar with the first and third ramps of the first half link are spaced apart by a first offset distance, the first half link having a first thickness at the bore, a ratio of the first offset distance to the first thickness ranging from about 0.75 to about 1.2.

3. The master link of claim 2 wherein the first offset distance of the first half link ranges from about 40 to about 50 mm.

4. The master link of claim 2 wherein the angle θ of the first half link is about 50°.

5. The master link of claim 1 wherein the second half link further includes a third ramp that meets the second ramp of the second half link and that is at least substantially parallel to the first ramp of the second half link, wherein lines coplanar with the first and third ramps of the second half link are spaced apart by a second offset distance, the second half link having a second thickness at the pin or bushing, a ratio of the second offset distance to the second thickness ranging from about 0.9 to about 1.35.

6. The master link of claim 5 wherein the second offset distance of the second half link ranges from about 40 to about 50 mm.

7. The master link of claim 5 wherein the angle θ of the second half link is about 50°.

8. The master link of claim 1, comprising a shoe coupled to the first half link and the second half link, wherein the second half link includes a shoe abutment surface that is engaged by the shoe, and wherein the second half link includes an eyebrow area extending along the shoe abutment surface and extending at least partially around the bushing or pin, the eyebrow area has a lateral thickness greater than a thickness of the second half link at the bore.

9. The master link of claim 1 wherein the second half link includes an eyebrow area extending at least partially around the bushing or pin, the eyebrow area having a lateral thickness greater than about 50 mm.

10. The master link of claim 1 wherein the first and second half links each include an eyebrow area extending at least partially around bores, the eyebrow areas of the first and second half links each having a lateral thickness, the lateral thickness of the eyebrow area of the second half link being from about 20 to about 50% greater than a lateral thickness of the first half link.

11. The master link of claim 1 wherein a ratio of the ramp offset distance over a track pitch ranges from about 0.1 to 0.25.

12. A machine comprising:
a drive chain;
a master link joint for the drive chain including two pairs of links, each pair including a first half link and a second half link, the two pairs of links being disposed on opposite sides of the chain;
each first half link including a bore for accommodating a pin that couples the first half links, each first half link including a first rail;
each second half link including a bore for accommodating a bushing or pin that couples the second half links, each second half link including a second rail;
a shoe coupled to the first and second half links of each pair;
the first and second half links of each pair each comprising first and second mating abutment surfaces respectively, the first and second mating abutment surfaces each including two ramps including a first ramp extending past its respective bore, each first ramp meeting a second ramp at a root,
a line planar with the second ramp and a line parallel to its respective first or second rail defining an angle θ ranging from about 45 to about 53°.

13. The machine of claim 12 wherein the angle θ is about 50°.

14. The machine of claim 12 wherein each half link further includes a third ramp that meets with the second ramp and that is at least substantially parallel to the first ramp, lines coplanar with the first and third ramps being spaced apart by an offset distance, the first and second half links each including a thickness at their respective bores, the offset distances of the first and second half links each ranging from about 0.75 to about 1.35 of the thicknesses at their respective bores.

15. The machine of claim 12 wherein the offset distance ranges from about 40 to about 50 mm.

16. The machine of claim 12 wherein a ratio of the ramp offset distances over the track pitch ranges for each link ranges from about 0.1 to about 0.25.

17. The machine of claim 12, wherein the second half links each include a shoe abutment surface that is engaged by the shoe, and wherein the second half links each including an eyebrow area extending along the shoe abutment surface and extending at least partially around its respective bore, the eyebrow areas having a lateral thickness greater than a thickness of the second half links at the bore.

18. The machine of claim 12 wherein the second half links each including an eyebrow area extending at least partially around the bushing, the eyebrow areas having a lateral thickness greater than about 50 mm.

19. A method for retrofitting an existing chain of a track-driven machine with an improved master link, the method comprising:
removing an existing master link joint from the chain;

providing two master links, each of the master links including a pair of half links, each of the pair of half links including a first half link and a second half link, each of the first half links including a bore for accommodating a pin and a first rail, each of the second half links including a bore for accommodating a pin or bushing and a second rail, the first and second half links each including first and second mating abutment surfaces respectively, the first and second mating abutment surfaces each including two ramps including a first ramp extending past its respective bore and meeting a second ramp at a root, each of the second ramps extending outwardly from each of the respective first ramps, a line coplanar with each of the second ramps and a line parallel to the respective first or second rail defining an angle $\theta$ ranging from about 45 to about 53°;

coupling the first half links together and to another pair of links in the chain with the pin;

coupling the second half links together with the pin or bushing;

engaging the first and second mating abutment surfaces of each pair; and connecting a shoe to all four half links.

20. The method of claim 19, wherein connecting the shoe comprises:

providing a shoe abutment surface on each of the second half links, the shoe abutment surface having unthreaded sections;

positioning the shoe over the shoe abutment surface;

driving fasteners through openings in the shoe and the unthreaded sections of the shoe abutment surface; and driving the fasteners through threaded sections of the first half links.

* * * * *